United States Patent
Bao et al.

(10) Patent No.: US 12,328,264 B2
(45) Date of Patent: Jun. 10, 2025

(54) METHOD AND APPARATUS FOR ENSURING DETERMINISTIC LATENCY OF NETWORK SLICE, STORAGE MEDIUM, AND PRODUCT

(71) Applicant: HUAWEI TECHNOLOGIES CO., LTD., Shenzhen (CN)

(72) Inventors: Lei Bao, Nanjing (CN); Xinjun Chen, Nanjing (CN); Zhaoyang Yan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 18/353,927

(22) Filed: Jul. 18, 2023

(65) Prior Publication Data

US 2024/0031299 A1    Jan. 25, 2024

(30) Foreign Application Priority Data

Jul. 19, 2022   (CN) .......................... 202210849193.2

(51) Int. Cl.
*H04L 47/2425* (2022.01)
*H04L 41/5019* (2022.01)
*H04L 45/02* (2022.01)
*H04L 45/302* (2022.01)
*H04L 47/10* (2022.01)

(52) U.S. Cl.
CPC .......... *H04L 47/2425* (2013.01); *H04L 45/02* (2013.01); *H04L 45/308* (2013.01); *H04L 47/18* (2013.01)

(58) Field of Classification Search
CPC ..... H04L 47/2425; H04L 47/18; H04L 45/02; H04L 45/308; H04L 45/121; H04L 45/302; H04L 41/5019
See application file for complete search history.

(56) References Cited

U.S. PATENT DOCUMENTS

| | | | |
|---|---|---|---|
| 2017/0099226 A1* | 4/2017 | Vasseur | H04L 47/826 |
| 2019/0132253 A1* | 5/2019 | Thubert | H04L 49/9005 |

(Continued)

FOREIGN PATENT DOCUMENTS

| | | | | |
|---|---|---|---|---|
| CN | 112953830 A | * | 6/2021 | G06N 3/126 |
| CN | 116455804 A | * | 7/2023 | H04L 45/12 |

(Continued)

OTHER PUBLICATIONS

Nayak et al., "Routing Algorithms for IEEE802.1Qbv Networks," Institute for Distributed and Parallel Systems Stuttgart, Germany, SIGBED Review, vol. 15, No. 3, Jun. 2018 (Year: 2018).*

(Continued)

*Primary Examiner* — Alina A Boutah
(74) *Attorney, Agent, or Firm* — Maier & Maier, PLLC

(57) ABSTRACT

A method and apparatus for ensuring a deterministic latency of a network slice, a storage medium, and a product, and belongs to the field of communication technologies. In this solution, topology information of different network slices can be associated with different gate scheduling periods, and the first device can determine a forwarding path of a service flow based on an SLA requirement and an association relationship between topology information and a gate scheduling period, so as to ensure a deterministic latency of the network slice. In addition, because different network slices can be associated with different gate scheduling periods, when the network slices are used to carry various service flows, different service flows may be scheduled and forwarded based on different gate scheduling periods, to meet latency jitter requirements of different services, and ensure deterministic latencies of various services.

18 Claims, 4 Drawing Sheets

(56) References Cited

U.S. PATENT DOCUMENTS

| | | | | |
|---|---|---|---|---|
| 2020/0259896 A1* | 8/2020 | Sachs | ................ | H04W 56/0065 |
| 2021/0105192 A1* | 4/2021 | Kahn | .................. | H04L 41/5009 |
| 2021/0377150 A1* | 12/2021 | Dugast | ................ | G06F 12/1027 |
| 2021/0400524 A1 | 12/2021 | Kahn et al. | | |
| 2022/0021625 A1* | 1/2022 | Tang | .................. | H04L 47/2416 |
| 2022/0200893 A1 | 6/2022 | Yao et al. | | |
| 2023/0156559 A1* | 5/2023 | Aijaz | ..................... | H04L 47/24 |

FOREIGN PATENT DOCUMENTS

| | | | | |
|---|---|---|---|---|
| CN | 117459414 A | * | 1/2024 | |
| KR | 102595945 B1 | * | 1/2022 | ............. H04L 45/02 |
| WO | WO-2020200405 A1 | * | 10/2020 | ........... H04L 45/121 |

OTHER PUBLICATIONS

Norman Finn, "Specifying P802.1Qbv Gate Schedules," Cisco, May 15, 2014 (Year: 2014).*
Kantarci et al., "Periodic GATE Optimization with QoS-Awareness for Long-Reach Passive Optical Networks," School of Information Technology and Engineering University of Ottawa, Ottawa, ON, Canada, IEEE 2010 (Year: 2010).*
Wikipedia: "Time-Sensitive Networking." (Year: 2024).*
IEEE Std 802.1Qbv™—2015, "IEEE Standard for Local and Metropolitan Area Networks—Bridges and Bridged Networks Amendment 25: Enhancements for Scheduled Traffic" IEEE Standards Association, IEEE Computer Society, Mar. 18, 2016, ISBN 978-1-5044-0721-2, 57 pages.

* cited by examiner

Network slice 1 (FlexE/channelized sub-interface): Flex-Algo (128), and a Qbv T period in the slice is 50 μs.

Network slice 2 (FlexE/channelized sub-interface): Flex-Algo (129), and a Qbv T period in the slice is 20 μs.

METHOD AND APPARATUS FOR ENSURING DETERMINISTIC LATENCY OF NETWORK SLICE, STORAGE MEDIUM, AND PRODUCT

CROSS-REFERENCE TO RELATED APPLICATIONS

This application claims priority to Chinese Patent Application No. 202210849193.2, filed on Jul. 19, 2022, which is incorporated herein by reference in its entirety.

TECHNICAL FIELD

The embodiments relate to the field of communication technologies, a method and apparatus for ensuring a deterministic latency of a network slice, a storage medium, and a product.

BACKGROUND

During service interaction between a source end and a destination end, a network node may transmit a packet between the source end and the destination end. In addition, the network node can determine a packet sending time point based on load of the network node. After the network node receives the packet, the network node immediately forwards the packet if current load is light; if current load is heavy, the network node first buffers the packet, and then forwards the packet after scheduling the packet.

Because there may be a service burst or a service decrease in a network, the load of the network node changes greatly, that is, the load is unstable. Therefore, forwarding the packet based on load cannot ensure an end-to-end deterministic latency of the packet, that is, has a large latency jitter. The end-to-end latency refers to duration in which a network node transmits a packet from a source end to a destination end. However, different services in the network may have different requirements on a latency jitter, and how to ensure deterministic latencies of various services is a current research hotspot.

SUMMARY

The embodiments may provide a method and apparatus for ensuring a deterministic latency of a network slice, a storage medium, and a product, to ensure a deterministic latency of a network slice, meet latency jitter requirements of different services when a network slice is used to carry various service flows, and ensure deterministic latencies of various services. The solutions are as follows.

According to a first aspect, a method for ensuring a deterministic latency of a network slice is provided, and the method includes:

A first device receives a control message sent by a second device, where the control message includes a first gate scheduling period and first topology information, and the control message indicates that the first gate scheduling period is associated with the first topology information; and the first device determines forwarding path information based on a service-level agreement (SLA) and the control message, where the forwarding path information indicates that performance of forwarding a service flow meets this SLA requirement.

The first topology information is topology information corresponding to a network slice. The second device is a network device.

In this solution, topology information of different network slices can be associated with different gate scheduling periods, and the first device can determine a forwarding path of a service flow based on the SLA requirement and an association relationship between the topology information and the gate scheduling periods, so as to ensure a deterministic latency of the network slice. In addition, the different network slices can be associated with the different gate scheduling periods. Therefore, when the network slices are used to carry various service flows, the different service flows may be scheduled and forwarded based on the different gate scheduling periods, to meet latency jitter requirements of the different services, and ensure deterministic latencies of various services.

Optionally, the first topology information includes a second flexible algorithm identity (Flex-Alog ID) or a first multi-topology identity (MT-ID). In other words, a network slice corresponding to topology information is indicated by using a Flex-Alog ID, or a network slice corresponding to topology information is indicated by using an MT-ID. A topology corresponding to the Flex-Alog ID may be referred to as a Flex-Alog topology, and a topology corresponding to the MT-ID may be referred to as an MT topology.

Optionally, the control message is an interior gateway protocol (IGP) packet, a border gateway protocol-link state (BGP-LS) packet, or a path computation element communication protocol (, PCEP) packet.

Optionally, the first device is a control device, the second device is a network device, and the forwarding path information indicates an end-to-end forwarding path and a network slice that needs to be used by each network device on the forwarding path to forward the service flow. That is, the control device collects an association relationship between topology information and a gate scheduling period, so as to perform centralized path computation.

Optionally, durations of gate scheduling periods and/or network slices that need to be used by network devices on the forwarding path to forward the service flow are different. In other words, in an implementation of centralized path computation, packets of a same service flow can be scheduled and forwarded by different network devices by using different gate scheduling periods or can be forwarded by different network devices by using different network slices, that is, can be forwarded across slice planes.

Optionally, the forwarding path information further indicates a sending time point, of the service flow, expected by each network device on the forwarding path. In this way, each network device on the forwarding path can forward the service flow based on the corresponding expected sending time point. This further ensures an end-to-end deterministic latency.

Optionally, that the first device determines forwarding path information based on an SLA requirement and the control message includes: The first device determines, based on the SLA requirement, information about the service flow, and an association relationship between topology information and a gate scheduling period, the forwarding path and the network slice that needs to be used by each network device on the forwarding path to forward the service flow.

Optionally, after that the first device determines forwarding path information based on an SLA requirement and the control message, the method further includes: The first device delivers the forwarding path information, to indicate a receiver of the forwarding path information to forward the service flow based on the forwarding path information.

Optionally, the first device and the second device are different network devices, and the forwarding path information indicates an egress port and a next-hop device of the service flow. In other words, the first device determines the egress port and the next-hop device of the service flow through distributed path computation.

Optionally, that the first device determines forwarding path information based on an SLA requirement and the control message includes: The first device determines, based on the SLA requirement, information about the service flow, and an association relationship between topology information and a gate scheduling period, a first network slice that needs to be used by the first device to forward the service flow; and the first device determines the egress port and the next-hop device according to a path computation algorithm corresponding to the first network slice.

Optionally, the first network slice has a first Flex-Alog ID, and the first Flex-Alog ID indicates the path computation algorithm corresponding to the first network slice.

Optionally, after that the first device determines forwarding path information based on an SLA requirement and the control message, the method further includes: The first device determines, from a plurality of logical interfaces corresponding to the egress port, a logical interface corresponding to the first network slice; and when a second gate scheduling period indicates that the logical interface corresponding to the first network slice is enabled, the first device sends the service flow to the next-hop device through the logical interface corresponding to the first network slice, where the second gate scheduling period is a gate scheduling period associated with topology information of the first network slice.

It should be noted that, after receiving the service flow, the next-hop device can determine, based on the SLA requirement, the information about the service flow, and the association relationship between the topology information and the gate scheduling period, that the network slice that needs to be used by the next-hop device to forward the service flow is also the first network slice. The next-hop device also determines the egress port of the service flow and the next-hop device according to the path computation algorithm corresponding to the first network slice. In other words, in a case of distributed path computation, all network devices on the forwarding path of the service flow forward the service flow by using the first network slice and the second gate scheduling period, so as to ensure an end-to-end deterministic latency.

According to a second aspect, an apparatus for ensuring a deterministic latency of a network slice is provided, and the apparatus for ensuring the deterministic latency of the network slice has a function of implementing behavior of the method for ensuring the deterministic latency of the network slice in the first aspect. The apparatus for ensuring the deterministic latency of the network slice includes one or more modules, and the one or more modules are configured to implement the method for ensuring the deterministic latency of the network slice in the first aspect.

In other words, the apparatus for ensuring the deterministic latency of the network slice is provided. The apparatus is used on a first device. The apparatus includes:
  a receiving module, configured to receive a control message sent by a second device, where the control message includes a first gate scheduling period and first topology information, and the control message indicates that the first gate scheduling period is associated with the first topology information; and
  a first determining module, configured to determine forwarding path information based on an SLA requirement and the control message, where the forwarding path information indicates that performance of forwarding a service flow meets the SLA requirement.

Optionally, the first device is a control device, the second device is a network device, and the forwarding path information indicates an end-to-end forwarding path and a network slice that needs to be used by each network device on the forwarding path to forward the service flow.

Optionally, durations of gate scheduling periods and/or network slices that need to be used by network devices on the forwarding path to forward the service flow are different.

Optionally, the forwarding path information further indicates a sending time point, of the service flow, expected by each network device on the forwarding path.

Optionally, the first determining module includes:
  a first determining submodule, configured to determine, based on the SLA requirement, information about the service flow, and an association relationship between topology information and a gate scheduling period, the forwarding path and the network slice that needs to be used by each network device on the forwarding path to forward the service flow.

Optionally, the apparatus further includes:
  a delivering module, configured to deliver the forwarding path information, to indicate a receiver of the forwarding path information to forward the service flow based on the forwarding path information.

Optionally, the first device and the second device are different network devices, and the forwarding path information indicates an egress port and a next-hop device of the service flow.

Optionally, the first determining module includes:
  a second determining submodule, configured to determine, based on the SLA requirement, information about the service flow, and an association relationship between topology information and a gate scheduling period, a first network slice that needs to be used by the first device to forward the service flow; and
  a third determining submodule, configured to determine the egress port and the next-hop device according to a path computation algorithm corresponding to the first network slice.

Optionally, the first network slice has a first Flex-Alog ID, and the first Flex-Alog ID indicates the path computation algorithm corresponding to the first network slice.

Optionally, the apparatus further includes:
  a second determining module, configured to determine, from a plurality of logical interfaces corresponding to the egress port, a logical interface corresponding to the first network slice; and
  a sending module, configured to: when a second gate scheduling period indicates that the logical interface corresponding to the first network slice is enabled, send the service flow to the next-hop device through the logical interface corresponding to the first network slice, where the second gate scheduling period is a gate scheduling period associated with topology information of the first network slice.

Optionally, the first topology information includes a second Flex-Alog ID or a first MT-ID.

Optionally, the control message is an IGP packet, a BGP-LS packet, or a PCEP packet.

According to a third aspect, an electronic device is provided, where the electronic device includes a processor and a memory, and the memory is configured to store a program for performing the method for ensuring the deterministic latency of the network slice in the first aspect; and store data used to implement the method for ensuring the deterministic latency of the network slice in the first aspect. The processor is configured to execute the program stored in the memory. The electronic device may further include a communication bus, and the communication bus is configured to establish a connection between the processor and the memory.

According to a fourth aspect, a computer-readable storage medium is provided. The computer-readable storage medium stores instructions. When the instructions are run on a computer, the computer is enabled to perform the method for ensuring the deterministic latency of the network slice in the first aspect.

According to a fifth aspect, a computer program product including instructions is provided. When the computer program product runs on a computer, the computer is enabled to perform the method for ensuring the deterministic latency of the network slice according to the first aspect.

Effects achieved in the second aspect, the third aspect, the fourth aspect, and the fifth aspect are similar to those achieved by corresponding means in the first aspect. Details are not described herein again.

The embodiments may bring at least the following beneficial effects.

In this solution, topology information of different network slices can be associated with different gate scheduling periods, and the first device can determine a forwarding path of a service flow based on the SLA requirement and the association relationship between the topology information and the gate scheduling periods, so as to ensure a deterministic latency of the network slice. In addition, the different network slices can be associated with the different gate scheduling periods. Therefore, when the network slices are used to carry various service flows, the different service flows may be scheduled and forwarded based on the different gate scheduling periods, to meet latency jitter requirements of the different services, and ensure deterministic latencies of various services.

DETAILED DESCRIPTION OF THE EMBODIMENTS

To make the objectives, solutions, and advantages of the embodiments clearer, the following further describes the implementations in detail with reference to the accompanying drawings.

For ease of understanding, some background knowledge in the embodiments is first described.

Flexible algorithm (Flex-Algo) is a flexible algorithm that allows users to create an independent topology and compute paths in an IGP. Currently, Flex-Algo may be used in a segment routing (SR) network. Flex-Algo provides a simple solution with separated routing planes, constrained traffic engineering (TE) paths, and low-latency routes, to meet differentiated requirements of various services in a 5G era.

A conventional IGP protocol uses a shortest path first (SPF) algorithm to calculate the shortest path to a destination address on an entire network topology based on a cost value of the link. However, when all packets select the shortest path with the smallest cost value, traffic paths of all services are fixed, and network resources cannot be flexibly used. In this context, a Flex-Algo technology is therefore developed. Flex-Algo allows devices to calculate constraint-based network paths based on the IGP, to implement a network TE capability more easily and flexibly.

Flex-Algo is not a specific algorithm. A user-defined algorithm range is Flex-Algo (128) to Flex-Algo (255), that is, 128 Flex-Algo IDs can be customized Each Flex-Algo algorithm is represented by using Flex-Algo (k), and a value of k ranges from 128 to 255. Flex-Algo (k) has local significance only in a logical topology that participates in this algorithm and is only uniquely defined.

The definition of Flex-Algo (k) includes the following three elements.

An element 1 is a calculation type (Calc-T). A value of the calculation type is '0' or '1'. '0' indicates an SPF, that is, the SPF in the conventional IGP. A Dijkstra shortest path first algorithm is used, and a local policy is allowed to overwrite a path calculated through the SPF. '1' indicates a strict SPF. A Dijkstra shortest path first algorithm is used, but a local policy is not allowed to overwrite a path calculated through the SPF, and the path calculated through the SPF is changed to a different path.

An element 2 is a metric type (M-T). A value of the metric type is '0', '1', or '2'. '0' indicates an IGP metric, that is, a link cost value in the conventional IGP. '1' indicates a minimum one-way link latency. '2' indicates a TE metric.

An element 3 is a constraint (constraints). A topology constraint is performed on a physical or logical connection through the constraint. A link that does not meet the constraint cannot participate in path computation.

Figure 1:
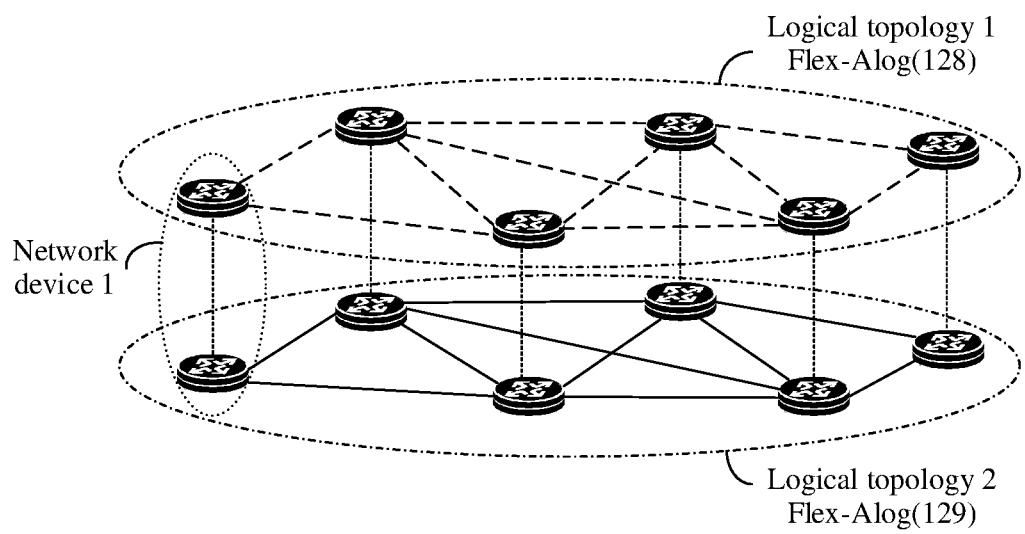
FIG. 1 is a schematic diagram of a logical topology formed based on a Flex-Alog technology according to an embodiment.

FIG. 1 is a schematic diagram of a logical topology formed based on a Flex-Alog technology according to an embodiment. In FIG. 1, there are six network devices, that is, network devices 1 to 6, and resources of the six network devices are all divided into two network slices, to form two logical topologies, that is, two slice topologies. The two network slices respectively correspond to Flex-Alog (128) and Flex-Alog (129). In FIG. 1, there are six pairs of device icons in a vertical direction. The six pairs of device icons correspond to the network devices 1 to 6. In FIG. 1, a first pair of device icons from the left corresponds to a network device 1.

For more information about the Flex-Alog technology, refer to related technologies. This is not described herein.

A deterministic latency and a jitter technology based on IEEE 802.1Qbv gate scheduling are based on a time switching mechanism, that is, a time aware shaping (TAS) mechanism or a TAS gating mechanism. The network node includes a plurality of queues, and the queues are used to buffer packets. In a related technology, a period length of a gate scheduling period is configured for a network node, each queue corresponds to one gate, and a packet in each queue can be scheduled and forwarded only in a period in which the gate is opened, so as to ensure a low latency jitter. In addition, gate scheduling periods configured for network nodes on the packet transmission path are the same. It can be understood that all network nodes in the related technology use a same gate scheduling period to transmit a service flow. This cannot meet requirements of different services for different latency jitters.

In a Flexible Ethernet (FlexE) technology, Flex-Eth defines an intermediate layer, that is, a FlexE Shim layer, between a layer 2 Ethernet (that is, a medium access control (MAC) layer) and an Ethernet layer (that is, a physical (PHY) layer). The FlexE technology is a new technology for Ethernet multi-rate sub-interfaces on a plurality of PHY links. Each PHY on the device carries all or some data flows from one or more sub-interfaces. A rate of each sub-interface is configurable. A data flow or a queue can be used as a sub-interface.

A channelized sub-interface technology is used for a sub-interface of an Ethernet physical port on which channelization is enabled. Different channelized sub-interfaces carry different types of services, and bandwidths are configured based on channelized sub-interfaces. In this way, the bandwidths between the different channelized sub-interfaces on the same physical interface are strictly isolated, and services on the different sub-interfaces do not preempt the bandwidths. The channelized sub-interfaces are used to reserve resources in a network slicing solution. An independent "lane" is divided for each network slice, and "lanes" cannot be changed during transmission of service traffic of different network slices. This ensures strict isolation of services of different slices and effectively prevents resource preemption between slices when traffic bursts occur.

In this embodiment, a plurality of network slices at a forwarding resource layer are formed based on hard slices such as a FlexE technology, a channelized sub-interface technology, or a quality of service (QoS) entity queue.

The following describes a system architecture in a method for ensuring a deterministic latency of a network slice in the embodiments.

Figure 2:
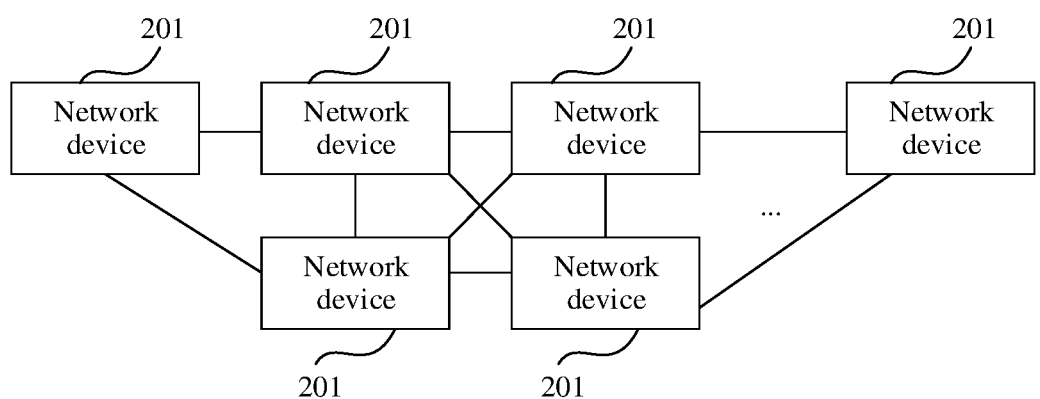
FIG. 2 is a diagram of a system architecture in a method for ensuring a deterministic latency of a network slice according to an embodiment.

FIG. 2 is a diagram of a system architecture in a method for ensuring a deterministic latency of a network slice according to an embodiment. Refer to FIG. 2. The system architecture includes a plurality of network devices 201. Each network device 201 in the plurality of network devices 201 establishes a communication connection to at least one another network device 201. A resource of each of the plurality of network devices 201 is divided into a plurality of network slices. Resources of a same network slice form one logical topology, and resources of different network slices form different logical topologies. The logical topology may also be referred to as a slice topology.

Each of the plurality of network devices 201 is configured to forward a service flow according to the method for ensuring the deterministic latency of the network slice in the embodiments. A forwarding path of the service flow is determined by the network device 201.

A first network device 201 in the plurality of network devices 201 is used as an example. The first network device 201 is configured to receive a control message sent by a second network device 201, where the control message includes a first gate scheduling period and first topology information, and the control message indicates that the first gate scheduling period is associated with the first topology information. The first network device 201 is further configured to determine forwarding path information based on an SLA requirement and the control message, where the forwarding path information indicates that performance of forwarding a service flow by the first network device 201 meets the SLA requirement. The forwarding path information indicates an egress port and a next-hop device of the service flow.

It should be understood that when the forwarding path of the service flow is determined by the network device, the network device can perform distributed path computation, and all network devices on the forwarding path of the service flow forward the service flow by using a same network slice and a same gate scheduling period.

Figure 3:
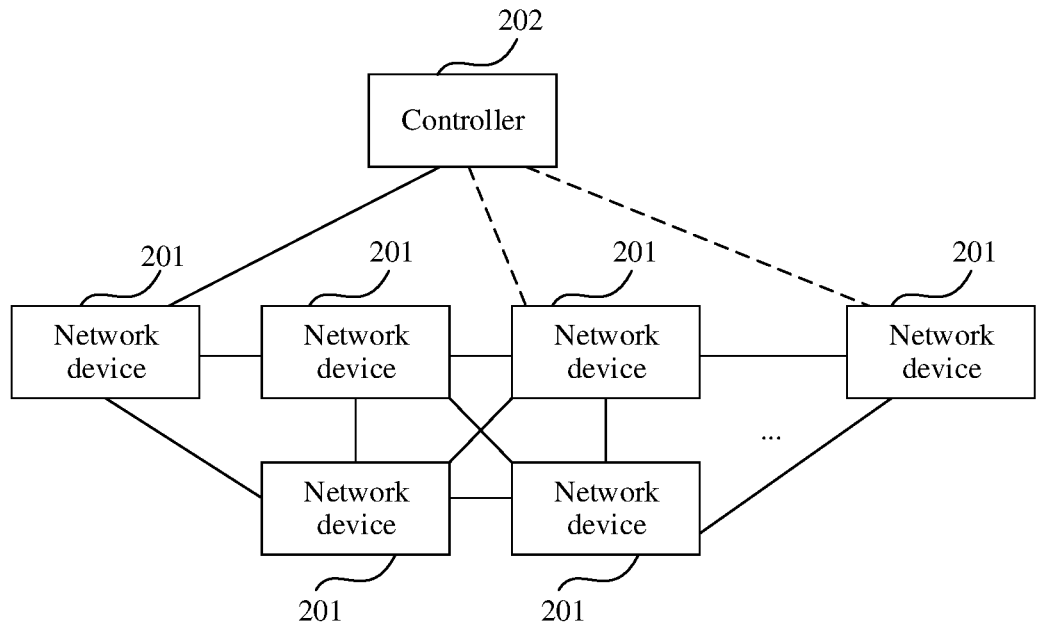
FIG. 3 is a diagram of another system architecture in a method for ensuring a deterministic latency of a network slice according to an embodiment.

FIG. 3 is a diagram of another system architecture in a method for ensuring a deterministic latency of a network slice according to an embodiment. A difference between FIG. 3 and FIG. 2 lies in the following: The system architecture shown in FIG. 3 further includes a controller 202 (also referred to as a control device). The controller 202 establishes a communication connection to a head node 201 (for example, a leftmost network device 201 in FIG. 3) in the plurality of network devices 201. The controller 202 can alternatively establish communication connections to all or some network devices 201 in the plurality of network devices 201 except the head node 201.

In FIG. 2, the forwarding path of the service flow is determined by the controller 202. In other words, the controller 202 is configured to receive a control message sent by a network device 201, where the control message includes the first gate scheduling period and the first topology information, and the control message indicates that the first gate scheduling period is associated with the first topology information. The controller 202 is further configured to determine forwarding path information based on an SLA requirement and the control message, where the forwarding path information indicates that performance of forwarding the service flow by the network device 201 meets the SLA requirement. The forwarding path information indicates an end-to-end forwarding path and a network slice that needs to be used by each network device 201 on the forwarding path to forward the service flow.

Optionally, the controller 202 is further configured to send the forwarding path information to the head node 201. The head node 201 is configured to encapsulate the forwarding path information into the service flow based on the forwarding path information and send the service flow to a next-hop device 201. Because the path forwarding information is encapsulated in the service flow, each network device 201 (including the next-hop device 201) on the forwarding path can send the service flow based on the forwarding path information.

It should be understood that, when the forwarding path of the service flow is determined by the controller 202, the controller 202 performs centralized path computation, and each network device 201 on the forwarding path of the service flow may forward the service flow by using a same or different network slice and/or gate scheduling period.

Optionally, in the system architecture shown in FIG. 1, the network device 201 can also perform centralized path computation. For example, the head node has a centralized path computation function, and the head node performs a corresponding operation of the controller 202, to determine the end-to-end forwarding path and the network slice that needs to be used by each network device 201 on the forwarding path to forward the service flow.

In conclusion, in a process of implementing the method for ensuring the deterministic latency of the network slice in this embodiment, each network device 201 performs distributed path computation, or the controller 202 or a network device 201 (for example, the head node, an intermediate node, or a tail node) performs centralized path computation.

In this embodiment, any network device 201 is a device such as a router, a switch, a network adapter, or a bridge, and the controller 202 is a device such as a server, a computer, a router, or a switch. In some embodiments, the controller 202 is a software defined network (SDN) controller.

The network architecture and the service scenario described in the embodiments are intended to describe the embodiments more clearly, and do not constitute a limitation on the embodiments. With the evolution of the network architecture and the emergence of new service scenarios, the embodiments are also applicable to similar problems.

Figure 4:
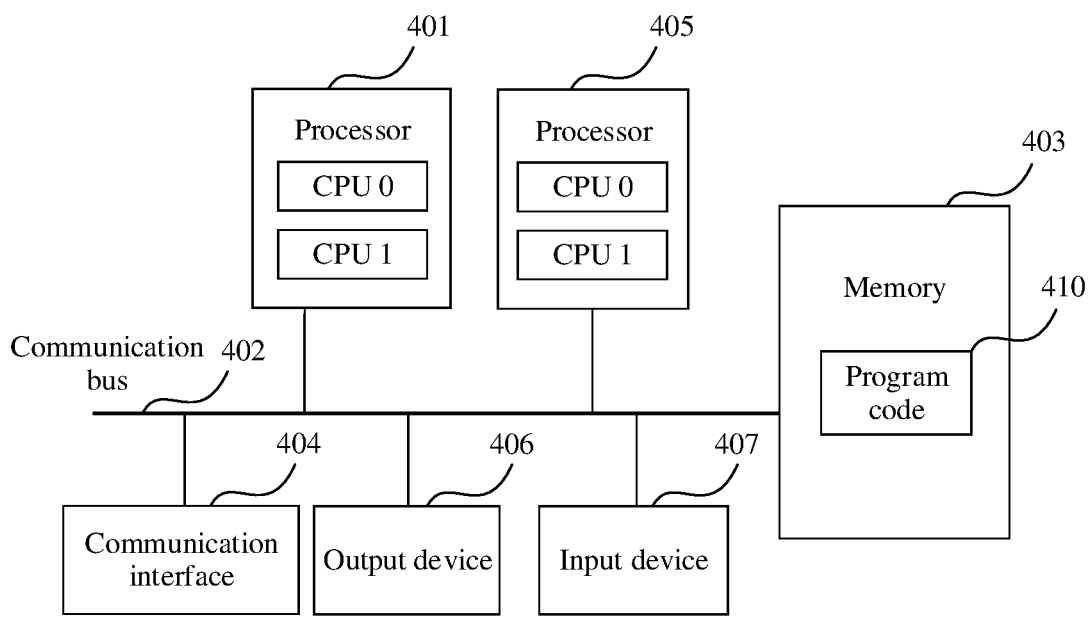
FIG. 4 is a schematic diagram of a structure of an electronic device according to an embodiment.

FIG. 4 is a schematic diagram of a structure of an electronic device according to an embodiment. Optionally, the electronic device is the network device shown in FIG. 2 and FIG. 3, or the controller shown in FIG. 3. The electronic device includes one or more processors 401, a communication bus 402, a memory 403, and one or more communication interfaces 404.

The processor 401 is a general-purpose central processing unit (CPU), a network processor (NP), a microprocessor, or one or more integrated circuits configured to implement the solutions, for example, an application-specific integrated circuit (ASIC), a programmable logic device (PLD), or a combination thereof. Optionally, the PLD is a complex programmable logic device (CPLD), a field-programmable gate array (FPGA), a generic array logic (GAL), or any combination thereof.

The communication bus 402 is configured to transfer information between the foregoing components. Optionally, the communication bus 402 may be classified as an address bus, a data bus, a control bus, or the like. For ease of representation, only one thick line is used to represent the bus in the figure, but this does not mean that there is only one bus or only one type of bus.

Optionally, the memory 403 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be used to carry or store expected program code in a form of instructions or a data structure and that is accessible to a computer. However, this is not limited hereto. The memory 403 exists independently and may be connected to the processor 401 through the communication bus 402 or the memory 403 may be integrated with the processor 401.

The communication interface 404 is configured to communicate with another device or a communication network by using any transceiver-type apparatus. The communication interface 404 includes a wired communication interface or may optionally include a wireless communication interface. The wired communication interface is, for example, an Ethernet interface. Optionally, the Ethernet interface is an optical interface, an electrical interface, or a combination thereof. The wireless communication interface is a wireless local area network (WLAN) interface, a cellular network communication interface, a combination thereof, or the like.

Optionally, in some embodiments, the electronic device includes a plurality of processors, such as the processor 401 and a processor 405 shown in FIG. 4. Each of the processors may be a single-core processor or a multi-core processor. Optionally, the processor herein is one or more devices, circuits, and/or processing cores for processing data (such as computer program instructions).

During implementation, in an embodiment, the electronic device further includes an output device 406 and an input device 407. The output device 406 may communicate with the processor 401 and may display information in a plurality of manners. For example, the output device 406 may be a liquid crystal display (LCD), a light emitting diode (LED) display device, a cathode ray tube (CRT) display device, or a projector. The input device 407 may communicate with the processor 401 and may receive an input of a user in a plurality of manners. For example, the input device 407 is a mouse, a keyboard, a touchscreen device, or a sensing device.

In some embodiments, the memory 403 is configured to store program code 410 for executing the solutions, and the processor 401 can execute the program code 410 stored in the memory 403. The program code includes one or more software modules. The electronic device can implement, by using the processor 401 and the program code 410 in the memory 403, a method for ensuring a deterministic latency of a network slice in the embodiment in FIG. 5 below.

Figure 5:
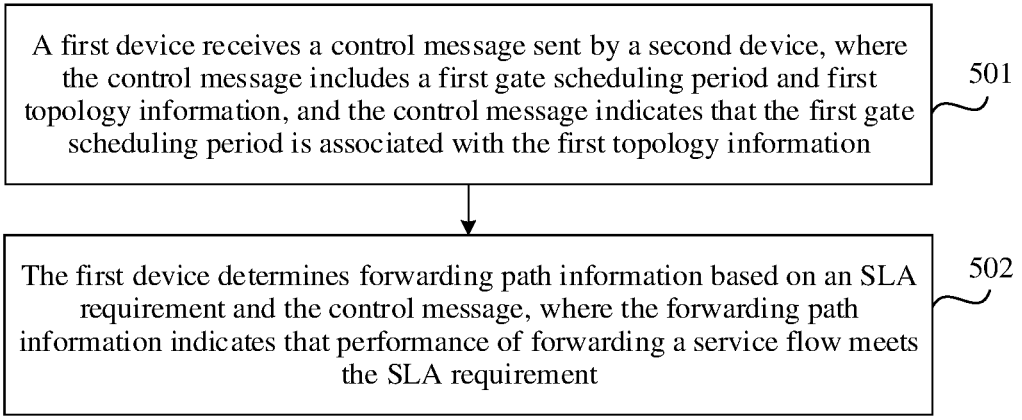
FIG. 5 is a flowchart of a method for ensuring a deterministic latency of a network slice according to an embodiment.

FIG. 5 is a flowchart of a method for ensuring a deterministic latency of a network slice according to an embodiment. The method is applied to a first device. Refer to FIG. 5. The method includes the following steps.

Step 501: A first device receives a control message sent by a second device, where the control message includes a first gate scheduling period and first topology information, and the control message indicates that the first gate scheduling period is associated with the first topology information.

It can be understood from the foregoing related descriptions of the system architecture in embodiments that this solution can be applied to a network device or a controller. In other words, the first device is a network device or a controller. In addition, a second device is a network device.

In an implementation in which the first device is the controller and the second device is the network device, the controller receives a control message sent by the network device, where the control message includes the first gate scheduling period and the first topology information, and the control message indicates that the first gate scheduling period is associated with the first topology information. The first topology information is topology information corresponding to a network slice. The second device is any network device in the plurality of network devices included in the foregoing system.

In an implementation in which the first device and the second device are different network devices, for example, the first device is referred to as a first network device, and the second device is referred to as a second network device, the first network device receives a control message sent by the second network device, where the control message includes the first gate scheduling period and the first topology information, and the control message indicates that the first gate scheduling period is associated with the first topology information. The first topology information is topology information corresponding to a network slice.

Optionally, in the foregoing two implementations, before sending the control message to the first device, the second device receives a configuration request, where the configuration request is used to configure the association relationship between the first gate scheduling period and the first topology information. The second device generates the control message based on the configuration request, and sends the control message to the first device, that is, notifies the first device of the association relationship between the first gate scheduling period and the first topology information. The configuration request may be triggered to be generated by a configuration operation of an administrator or may be triggered to be generated by another event. In addition, the second device determines, based on the configuration request, to make the association relationship between the first gate scheduling period and the first topology information take effect on the second device.

It should be noted that the first device may further receive a control message sent by another network device. If the control message includes a second gate scheduling period and the first topology information, it indicates that a configuration of the gate scheduling period of the first topology information conflicts. In this case, the first device selects one gate scheduling period from a plurality of gate scheduling periods according to a preset rule and uses the selected gate scheduling period as the gate scheduling period associated with the first topology information. The plurality of gate scheduling periods may include the first gate scheduling period and the second gate scheduling period.

The preset rule includes sizes of device internet protocol (IP) addresses of senders of a plurality of control messages. The first device determines, as the selected gate scheduling period, a gate scheduling period in a control message sent by a sender with a largest or smallest IP address in the plurality of senders. Alternatively, the control messages further include priorities of corresponding gate scheduling periods, the preset rule includes the priorities of the gate scheduling periods, and the first device determines, as the selected gate scheduling period, a gate scheduling period with the highest priority in the plurality of gate scheduling periods. Alternatively, the preset rule is another rule. This is not limited in this embodiment.

Optionally, the first gate scheduling period is 20 microseconds (µs), 30 µs, or 50 µs. The second gate scheduling period is 10 µs, 20 µs, or 50 µs.

In embodiment of distributed path computation, the first device is a network device. After selecting one gate scheduling period from the plurality of gate scheduling periods according to the preset rule and using the selected gate scheduling period as the gate scheduling period associated with the first topology information, the first device makes the association relationship between the first topology information and the corresponding gate scheduling period take effect on the first device. It should be noted that a control message generated on a network device is notified to other network devices in the system, and each network device determines, according to the same preset rule, a gate scheduling period associated with each piece of topology information. In this way, association relationships that are between the topology information and the gate scheduling periods and that are effective on the network devices are the same.

In this embodiment of centralized path computation, for example, the controller performs centralized path computation. After determining, according to the preset rule, the gate scheduling period associated with each piece of topology information, the controller notifies each network device of the gate scheduling period associated with each piece of topology information, so as to indicate each network device to make the association relationship between the topology information and the gate scheduling period take effect on the corresponding network device. In some embodiments, the controller may not notify, to each network device, the gate scheduling period associated with each piece of topology information.

Optionally, in this embodiment, the first topology information includes a second Flex-Alog ID or a first multi-topology identifier MT-ID. In other words, in this embodiment, a network slice corresponding to topology information is indicated by using a Flex-Alog ID, or a network slice corresponding to topology information is indicated by using an MT-ID. A topology corresponding to the Flex-Alog ID may be referred to as a Flex-Alog topology, and a topology corresponding to the MT-ID may be referred to as an MT topology.

It should be noted that, in the embodiment in which the network slice corresponding to the topology information is indicated by using the Flex-Alog ID, one network slice corresponds to one Flex-Alog ID, and one Flex-Alog ID corresponds to one or more network slices. In other words, different network slices may correspond to a same Flex-Alog ID. Optionally, in the embodiment in which the network slice corresponding to the topology information is indicated by using the MT-ID, one network slice corresponds to one MT-ID, and one MT-ID corresponds to one or more network slices. In other words, different network slices may correspond to a same MT-ID.

Optionally, in the embodiment in which the network slice corresponding to the topology information is indicated by using the Flex-Alog ID, the foregoing control message is a notification message about a Flex-Alog instance. For example, the second Flex-Alog ID is defined on the second device, including defining elements of the second Flex-Alog ID (where the elements include a calculation type, a metric type, and a constraint condition) and the first gate scheduling period. After the second Flex-Alog ID is defined, the second device generates the control message, where the control message includes the first gate scheduling period, the second Flex-Alog ID, and the elements of the second Flex-Alog ID. In other words, the association relationship between the first gate scheduling period and the second Flex-Alog ID is notified in the Flex-Alog instance.

Alternatively, the second Flex-Alog ID is defined on the second device, including defining the elements of the second Flex-Alog ID. After the second Flex-Alog ID is defined, the second device generates a Flex-Alog notification packet, where the Flex-Alog notification packet includes the second Flex-Alog ID and the elements of the second Flex-Alog ID. Then, the first gate scheduling period corresponding to the second Flex-Alog ID is configured on the second device. After the configuration, the second device generates the foregoing control message, where the control message includes the first gate scheduling period and the second Flex-Alog ID. In other words, the association relationship between the first gate scheduling period and the second Flex-Alog ID is separately notified through the control message.

Optionally, one control message carries one gate scheduling period and one piece of topology information. Alternatively, one control message carries a plurality of gate scheduling periods and a plurality of pieces of topology information, and the plurality of gate scheduling periods are in a one-to-one correspondence with the plurality of pieces of topology information. For example, the control message received by the first device carries the first gate scheduling period and the first topology information, and the second gate scheduling period and second topology information. The control message indicates that the first gate scheduling period is associated with the first topology information and indicates that the second gate scheduling period is associated with the second topology information. For example, the gate scheduling period is Qbv T, the topology information includes the Flex-Alog ID, and a control message carries [Flex-Alog(128):Qbv T=50 μs, Flex-Alog(129):Qbv T=20 μs].

Optionally, the control message is an IGP packet, a border gateway protocol-link state (BGP-LS) packet, or a path computation element communication protocol (PCEP) packet.

For example, the control message is the IGP packet, and the first topology information is the second Flex-Algo ID. In a process in which the association relationship between the Flex-Algo ID and the gate scheduling period is notified through the IGP packet, the IGP packet carries an extension field, where the extended field is used to carry the gate scheduling period. The extension field may be a type-length-value TLV field. The foregoing IGP packet can be flooded in a network, so as to notify the association relationship between the Flex-Algo ID and the gate scheduling period to another network device.

Step 502: The first device determines forwarding path information based on the SLA requirement and the control message, where the forwarding path information indicates that performance of forwarding the service flow meets the SLA requirement.

In an implementation in which the first device is the controller and the second device is the network device, an implementation process in which the first device determines the forwarding path information based on the SLA requirement and the control message includes: The first device determines, based on the SLA requirement, information about the service flow, and the association relationship between the topology information and the gate scheduling period, an end-to-end forwarding path and a network slice that needs to be used by each network device on the forwarding path to forward the service flow. In other words, the forwarding path information indicates the end-to-end forwarding path and the network slice that needs to be used by each network device on the forwarding path to forward the service flow.

Optionally, the forwarding path information includes a plurality of node identifiers or at least one link identifier, and a slice identifier of the network slice that needs to be used by each network device on the forwarding path to forward the service flow. Alternatively, the forwarding path information includes a node identifier or a link identifier on the end-to-end forwarding path, and a gate scheduling period associated with the network slice that needs to be used by each network device on the forwarding path to forward the service flow. In short, the forwarding path is indicated through the plurality of node identifiers or is indicated through the at least one link identifier. The network slice that needs to be used by each network device on the forwarding path to forward the service flow is indicated through the slice identifier or is indicated through the gate scheduling period associated with the network slice.

Optionally, the first device performs path computation based on the foregoing information and a segment routing policy (SR Policy), to determine the forwarding path information. In a process of performing path computation according to the SR Policy, the first device performs path computation based on an adjacency segment identifier (Adj SID) of a link, where an Adj SID of a link in each network slice has a corresponding gate scheduling period, and the forwarding path information determined by the first device includes an Adj SID of the at least one link. In other words, the first device performs path computation based on the association relationship between the link identifier and the gate scheduling period. Alternatively, in the process of performing path computation according to the SR Policy, the first device performs path computation based on a node segment identifier (Node SID) of a node, where a node SID of a node in each network slice has a corresponding the attribute of gate scheduling period, and the forwarding path information determined by the first device includes Node SIDs of a plurality of nodes. In other words, the first device performs path computation based on the association relationship between the node identifier and the gate scheduling period.

Optionally, the forwarding path information further includes a sending time point, of the service flow, expected by each network device on the forwarding path. In other words, in an implementation of centralized path computation, the first device can determine not only the end-to-end forwarding path and the network slice that needs to be used by each network device on the forwarding path to forward the service flow, but also a sending time point, of the service flow, expected by each network device on the forwarding path, so that each network device on the forwarding path forwards the service flow based on the corresponding expected sending time point. This further ensures an end-to-end deterministic latency.

Optionally, the SLA requirement includes one or more of the following: link bandwidth, latency, jitter, packet loss, slicing, and reliability. The slicing requirement includes one or more of the following: slice bandwidth, slice timeslot, and the like. The information about the service flow indicates a source address, a destination address, and the like of the service flow. The association relationships between the topology information and the gate scheduling periods include the association relationship between the first topology information and the first gate scheduling period, and may further include an association relationship between other topology information and a gate scheduling period. The first device determines, based on the foregoing information, the end-to-end forwarding path and the network slice that needs to be used by each network device on the forwarding path to forward the service flow, so that a deterministic latency of the network slice is ensured in a process in which each network device forwards the service flow based on the forwarding path and the corresponding network slice, and performance of forwarding the service flow meets the SLA requirement.

Optionally, durations of gate scheduling periods and/or network slices that need to be used by network devices on the forwarding path to forward the service flow are different. In other words, in an implementation of centralized path computation, packets of a same service flow can be scheduled and forwarded by different network devices by using different gate scheduling periods or can be forwarded by different network devices by using different network slices. In other words, packets of a same service flow can be forwarded across slice planes.

It should be noted that one network slice corresponds to one gate scheduling period, and different network slices may correspond to a same gate scheduling period. Packets of a same service flow are scheduled and forwarded by different network devices by using different gate scheduling periods. This means that the packets of the service flow are forwarded by the different network devices by using different network slices. However, the packets of the same service flow are forwarded by different network devices by using different network slices. This does not mean that the packets of the service flow are scheduled and forwarded by the different network devices by using different gate scheduling periods. It is possible that packets of the service flow are scheduled and forwarded by two network devices by using the same gate scheduling period.

For example, there are the following network devices on the forwarding path of the service flow: a network device 1, a network device 2, and a network device 3. The path forwarding information indicates that the network device 1 forwards the service flow by using a first network slice, indicates that the network device 2 forwards the service flow by using a second network slice, and indicates the network device 3 to forward the service flow by using the first network slice. The first network slice and the second network slice correspond to a same gate scheduling period or different gate scheduling periods.

In this embodiment, when the first device is the controller, after determining the forwarding path information, the first device delivers the forwarding path information, to indicate a receiver of the forwarding path information to forward the service flow based on the forwarding path information.

Optionally, the first device delivers the forwarding path information to the head node. The head node encapsulates the forwarding path information in the service flow based on the forwarding path information and sends the service flow to a next-hop device. Because the path forwarding information is encapsulated in the service flow, each network device (including the next-hop device) on the forwarding path can send the service flow based on the forwarding path information.

For example, the forwarding path information is encapsulated in the packet of the service flow in a form of a label stack. When the forwarding path information includes a plurality of node identifiers and a slice identifier of the network slice that needs to be used by each network device on the forwarding path to forward the service flow, the head node sequentially pushes the plurality of node identifiers into a label stack based on an order of all network devices on the forwarding path, and sequentially pushes a plurality of slice identifiers corresponding to the plurality of node identifiers into the label stack. A node identifier in the label stack is followed by a corresponding slice identifier, or the plurality of node identifiers in the label stack are followed by the plurality of slice identifiers.

In an implementation in which the first device and the second device are different network devices, an implementation process in which the first device determines the forwarding path information based on the SLA requirement and the control message includes: The first device determines, based on the SLA requirement, the information about the service flow, and the association relationship between the topology information and the gate scheduling period, a first network slice that needs to be used by the first device to forward the service flow; and the first device determines the egress port and the next-hop device of the service flow according to a path computation algorithm corresponding to the first network slice. That is, the forwarding path information indicates the egress port and the next-hop device of the service flow.

For descriptions of the SLA requirement, the information about the service flow, and the association relationship between the topology information and the gate scheduling period, refer to the foregoing related content. Details are not described herein again. The first device determines, based on the foregoing information, the first network slice that needs to be used by the first device to forward the service flow, so as to perform distributed path computation according to a path computation algorithm corresponding to the first network slice, that is, determines an egress port and a next-hop device of the service flow.

Optionally, the first network slice has a first Flex-Alog ID, and the first Flex-Alog ID indicates the path computation algorithm corresponding to the first network slice. Alternatively, the first network slice has a second MT-ID, and the second MT-ID indicates a path computation algorithm corresponding to the first network slice.

After the first device determines the egress port and the next-hop device of the service flow by using the distributed path computation, the first device determines, from a plurality of logical interfaces corresponding to the egress interface, a logical interface corresponding to the first network slice. When a second gate scheduling period indicates that the logical interface corresponding to the first network slice is enabled, the first device sends the service flow to the next-hop device through the logical interface corresponding to the first network slice. The second gate scheduling period is a gate scheduling period associated with the topology information of the first network slice.

It should be noted that, after receiving the service flow, the next-hop device can determine, based on the SLA requirement, the information about the service flow, and the association relationship between the topology information and the gate scheduling period, that the network slice that needs to be used by the next-hop device to forward the service flow is also the first network slice. The next-hop device also determines the egress port of the service flow and the next-hop device according to the path computation algorithm corresponding to the first network slice. In other words, in a case of distributed path computation, all network devices on the forwarding path of the service flow forward the service flow by using the first network slice and the second gate scheduling period, so as to ensure an end-to-end deterministic latency.

Figure 6:
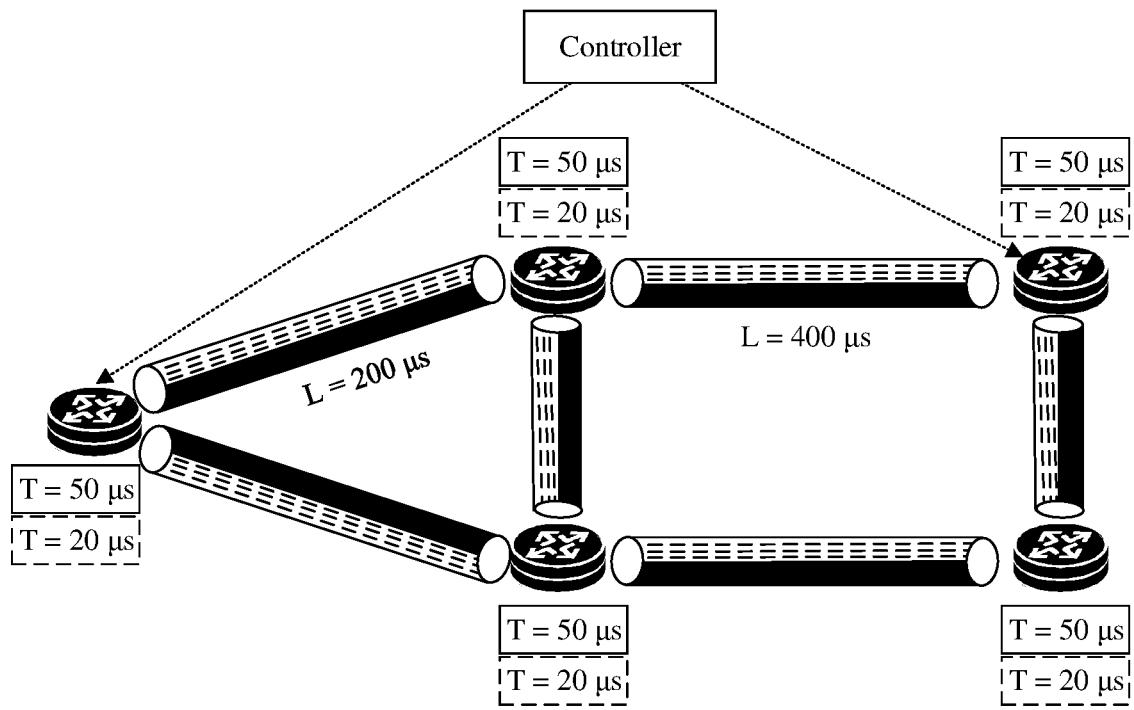
FIG. 6 is a diagram of still another system architecture in a method for ensuring a deterministic latency of a network slice according to an embodiment.
Figure 6:
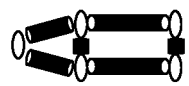
Figure 6:
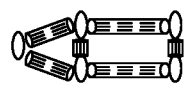
Figure 7:
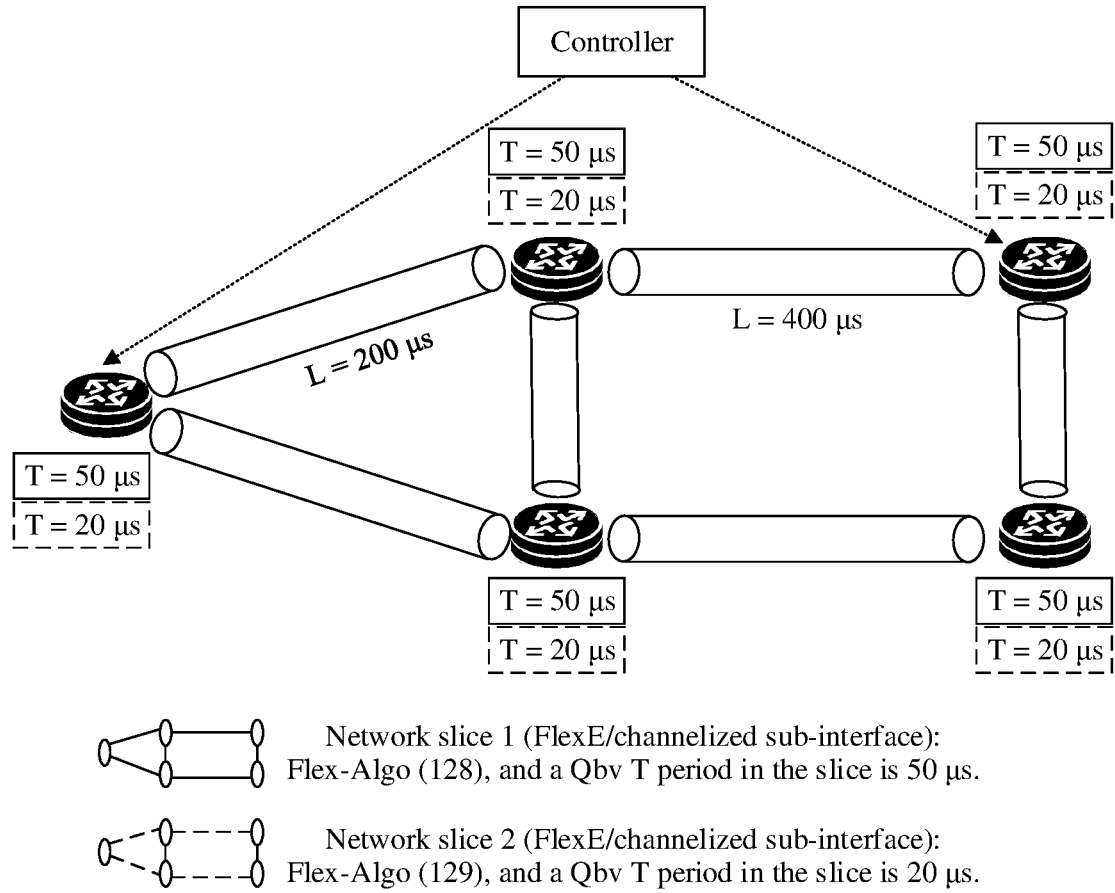
FIG. 7 is a diagram of still another system architecture in a method for ensuring a deterministic latency of a network slice according to an embodiment.

The following describes an example of this solution with reference to the system architectures shown in FIG. 6 and FIG. 7.

The system shown in FIG. 6 includes five network devices. Resources of the five network devices are all divided into two network slices, that is, a network slice 1 and a network slice 2. Network slice division is based on a FlexE technology, a channelized sub-interface technology, or another technology. The network slice 1 and the network slice 2 respectively correspond to a Flex-Alog (128) and a Flex-Alog (129). Qbv T periods (that is, gate scheduling periods) corresponding to the network slice 1 and the network slice 2 are respectively 50 μs and 20 μs. Service flows are forwarded in logical topologies restricted by Flex-Algo IDs corresponding to the network slice 1 and the network slice 2, and gate scheduling is performed in the corresponding logical topologies based on the corresponding Qbv T periods, so as to implement deterministic latencies and jitters in different network slices.

For example, a service flow is forwarded in the network slice 1, and a distributed path computation is performed. All network devices on a forwarding path of the service flow determine an egress port and a next-hop device of the service flow according to a path computation algorithm corresponding to the Flex-Alog (128). In addition, a gate scheduling period is 50 μs. The service flow is carried in a logical link that is between network devices and that is indicated by black padding. That is, one physical link is divided into a plurality of logical links, and different Flex-Alog IDs do not share the physical link. An expected latency of the physical link is determined. For example, as shown in FIG. 6, an expected latency L of a physical link is equal to 200 µs, and an expected latency L of another physical link is equal to 400 µs. The latency of the physical link is determined and the deterministic latency based on the gate scheduling period is ensured, so that a deterministic latency of the network slice is ensured, that is, an end-to-end deterministic latency and a latency jitter are ensured.

It should be noted that the controller shown in FIG. 6 is optional. When the system includes the controller, the controller can be configured to perform the foregoing step 501 and step 502. When the system does not include the controller, the network device can be configured to perform the foregoing step 501 and step 502.

FIG. 7 shows another system architecture similar to that in FIG. 6. A difference between FIG. 7 and FIG. 6 lies in that different Flex-Alog IDs can share a physical link, that is, one physical link is not divided into a plurality of logical links, a service flow is transmitted on the physical link between network devices, and some resources of the physical link are not exclusively used. However, a service flow carried in a network slice corresponding to each Flex-Alog ID is still scheduled and forwarded based on a corresponding gate scheduling period.

In conclusion, in this embodiment, topology information of different network slices can be associated with different gate scheduling periods, and the first device can determine a forwarding path of a service flow based on the SLA requirement and the association relationship between the topology information and the gate scheduling periods, so as to ensure a deterministic latency of the network slice. In addition, the different network slices can correspond to the different gate scheduling periods. Therefore, when the network slices are used to carry various service flows, the different service flows may be scheduled and forwarded based on the different gate scheduling periods, to meet latency jitter requirements of the different services, and ensure deterministic latencies of various services.

Figure 8:
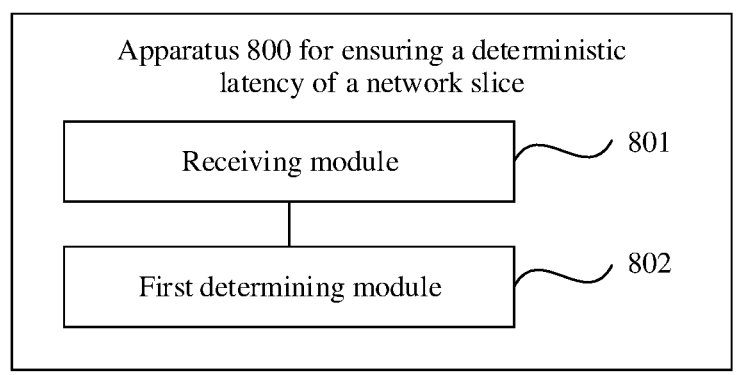
FIG. 8 is a schematic diagram of a structure of an apparatus for ensuring a deterministic latency of a network slice according to an embodiment.

FIG. 8 is a schematic diagram of a structure of an apparatus 800 for ensuring a deterministic latency of a network slice according to an embodiment. The apparatus 800 for ensuring a deterministic latency of a network slice may be implemented as a part or all of an electronic device by using software, hardware, or a combination thereof. The electronic device may be the network device or the control device in the foregoing embodiment. In this embodiment, the apparatus 800 is used on a first device. Refer to FIG. 8. The apparatus 800 includes a receiving module 801 and a first determining module 802.

The receiving module 801 is configured to receive a control message sent by a second device, where the control message includes a first gate scheduling period and first topology information, and the control message indicates that the first gate scheduling period is associated with the first topology information.

The first determining module 802 is configured to determine forwarding path information based on an SLA requirement and the control message, where the forwarding path information indicates that performance of forwarding a service flow meets the SLA requirement.

Optionally, the first device is a control device, the second device is a network device, and the forwarding path information indicates an end-to-end forwarding path and a network slice that needs to be used by each network device on the forwarding path to forward the service flow.

Optionally, durations of gate scheduling periods and/or the network slices required for forwarding the service flow by network devices on the forwarding path are different.

Optionally, the forwarding path information further indicates a sending time point, of the service flow, expected by each network device on the forwarding path.

Optionally, the first determining module 802 includes:
a first determining submodule, configured to determine, based on the SLA requirement, information about the service flow, and an association relationship between topology information and a gate scheduling period, the forwarding path and the network slice that needs to be used by each network device on the forwarding path to forward the service flow.

Optionally, the apparatus 800 further includes:
a delivering module, configured to deliver the forwarding path information, to indicate a receiver of the forwarding path information to forward the service flow based on the forwarding path information.

Optionally, the first device and the second device are different network devices, and the forwarding path information indicates an egress port and a next-hop device of the service flow.

Optionally, the first determining module 802 includes:
a second determining submodule, configured to determine, based on the SLA requirement, information about the service flow, and an association relationship between topology information and a gate scheduling period, a first network slice that needs to be used by the first device to forward the service flow; and
a third determining submodule, configured to determine the egress port and the next-hop device according to a path computation algorithm corresponding to the first network slice.

Optionally, the first network slice has a first Flex-Alog ID, and the first Flex-Alog ID indicates the path computation algorithm corresponding to the first network slice.

Optionally, the apparatus 800 further includes:
a second determining module, configured to determine, from a plurality of logical interfaces corresponding to the egress port, a logical interface corresponding to the first network slice; and
a sending module, configured to: when a second gate scheduling period indicates that the logical interface corresponding to the first network slice is enabled, send the service flow to the next-hop device through the logical interface corresponding to the first network slice, where the second gate scheduling period is a gate scheduling period associated with topology information of the first network slice.

Optionally, the first topology information includes a second Flex-Alog ID or a first MT-ID.

Optionally, the control message is an IGP packet, a BGP-LS packet, or a PCEP packet.

In this embodiment, topology information of different network slices can be associated with different gate scheduling periods, and the first device can determine a forwarding path of a service flow based on the SLA requirement and the association relationship between the topology information and the gate scheduling periods, so as to ensure a deterministic latency of the network slice. In addition, the different network slices can be associated with the different gate scheduling periods. Therefore, when the network slices are used to carry various service flows, the different service flows may be scheduled and forwarded based on the different gate scheduling periods, to meet latency jitter requirements of the different services, and ensure deterministic latencies of various services.

It should be noted that, when the apparatus for ensuring the deterministic latency of the network slice in the foregoing embodiment ensures the deterministic latency, division of the foregoing functional modules is merely used as an example for description. In actual application, the foregoing functions may be allocated to different functional modules for implementation according to a requirement, that is, an internal structure of the device is divided into different functional modules, to implement all or some of the functions described above. In addition, the apparatus for ensuring the deterministic latency of the network slice in the foregoing embodiment and the method embodiment for ensuring the deterministic latency of the network slice are based on a same conception. For an implementation process of the apparatus, refer to the method embodiment. Details are not described herein again.

All or a part of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedure or functions according to embodiments are all or partially generated. The computer may be a general-purpose computer, a dedicated computer, a computer network, or other programmable apparatuses. The computer instructions may be stored in a non-transitory computer-readable storage medium. The non-transitory computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like.

It should be understood that "at least one" means one or more and "a plurality of" means two or more. In descriptions of the embodiments, unless otherwise specified, "/" means "or". For example, A/B may represent A or B. Additionally, "and/or" describes only an association relationship between associated objects and represents that three relationships may exist. For example, A and/or B may represent the following three cases: only A exists, both A and B exist, and only B exists. In addition, to clearly describe the embodiments, terms such as first and second are used to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, information (including, but not limited to, user equipment information and user personal information), data (including, but not limited to, data used for analysis, stored data, and displayed data), and signals involved in the embodiments are authorized by the user or fully authorized by all parties, and collection, use, and processing of related data need to comply with related laws, regulations, and standards of related countries and regions. For example, all SLA requirements and service flows involved in the embodiment are obtained in a case of full authorization.

The foregoing descriptions are embodiments but are not intended as limiting. Any modification, equivalent replacement, or improvement made without departing from the principle shall fall within the scope of the embodiments.

What is claimed is:

1. A method for ensuring a deterministic latency of a network slice, the method comprising:
   receiving, by a first device, a control message sent by a second device, wherein the control message comprises a first gate scheduling period and first topology information, and the control message indicates that the first gate scheduling period is associated with the first topology information; and
   determining, by the first device, forwarding path information based on a service-level agreement (SLA) requirement and the control message, wherein the forwarding path information indicates that performance of forwarding a service flow meets the SLA requirement,
   wherein the first device is a control device, the second device is a network device, and the forwarding path information indicates an end-to-end forwarding path and a network slice that needs to be used by each network device on the forwarding path to forward the service flow.

2. The method according to claim 1, wherein durations of gate scheduling periods and/or network slices that need to be used by network devices on the forwarding path to forward the service flow are different.

3. The method according to claim 1, wherein the forwarding path information further indicates a sending time point, of the service flow, expected by each network device on the forwarding path.

4. The method according to claim 1, wherein determining, by the first device, the forwarding path information based on the SLA requirement and the control message further comprises:
   determining, by the first device based on the SLA requirement, information about the service flow, and an association relationship between topology information and a gate scheduling period, the forwarding path and the network slice that needs to be used by each network device on the forwarding path to forward the service flow.

5. The method according to claim 1, wherein after determining, by the first device, the forwarding path information based on the SLA requirement and the control message, the method further comprises:
   delivering, by the first device, the forwarding path information, to indicate a receiver of the forwarding path information to forward the service flow based on the forwarding path information.

6. The method according to claim 1, wherein the first device and the second device are different network devices, and the forwarding path information indicates an egress port and a next-hop device of the service flow.

7. The method according to claim 6, wherein determining, by the first device, the forwarding path information based on the SLA requirement and the control message further comprises:
   determining, by the first device based on the SLA requirement, information about the service flow, and an association relationship between topology information and a gate scheduling period, a first network slice that needs to be used by the first device to forward the service flow; and determining, by the first device, the egress port and the next-hop device according to a path computation algorithm corresponding to the first network slice.

8. The method according to claim 7, wherein the first network slice has a first flexible algorithm identifier (Flex-Alog ID), and the first Flex-Alog ID indicates the path computation algorithm corresponding to the first network slice.

9. The method according to claim 6, wherein after determining, by the first device, the forwarding path information based on the SLA requirement and the control message, the method further comprises:
- determining, by the first device from a plurality of logical interfaces corresponding to the egress port, a logical interface corresponding to the first network slice; and
- when a second gate scheduling period indicates that the logical interface corresponding to the first network slice is enabled, sending, by the first device, the service flow to the next-hop device through the logical interface corresponding to the first network slice, wherein the second gate scheduling period is a gate scheduling period associated with topology information of the first network slice.

10. The method according to claim 1, wherein the first topology information comprises a second Flex-Alog ID or a first multi-topology identifier (MT-ID).

11. The method according to claim 1, wherein the control message is an interior gateway protocol (IGP) packet, a border gateway protocol-link state (BGP-LS) packet, or a path computation element communication protocol (PCEP) packet.

12. An apparatus for ensuring a deterministic latency of a network slice, wherein the apparatus is used on a first device, the apparatus comprising:
- a non-transitory memory storing instructions; and
- a processor coupled to the non-transitory memory; wherein the instructions, when executed by the processor, cause the apparatus to be configured to:
  - receive, by a first device, a control message sent by a second device, wherein the control message comprises a first gate scheduling period and first topology information, and the control message indicates that the first gate scheduling period is associated with the first topology information; and
  - determine forwarding path information based on a service-level agreement (SLA) requirement and the control message, wherein the forwarding path information indicates that performance of forwarding a service flow meets the SLA requirement,
- wherein the first device is a control device, the second device is a network device, and the forwarding path information indicates an end-to-end forwarding path and a network slice that needs to be used by each network device on the forwarding path to forward the service flow.

13. The apparatus according to claim 12, wherein durations of gate scheduling periods and/or network slices that need to be used by network devices on the forwarding path to forward the service flow are different.

14. The apparatus according to claim 12, wherein the forwarding path information further indicates a sending time point, of the service flow, expected by each network device on the forwarding path.

15. The apparatus according to claim 12, wherein the instructions, when executed by the processor, further cause the apparatus to be configured to:
- determine, based on the SLA requirement, information about the service flow, and an association relationship between topology information and a gate scheduling period, the forwarding path and the network slice that needs to be used by each network device on the forwarding path to forward the service flow.

16. The apparatus according to claim 12, wherein the instructions, when executed by the processor, further cause the apparatus to be configured to:
- deliver the forwarding path information, to indicate a receiver of the forwarding path information to forward the service flow based on the forwarding path information.

17. The apparatus according to claim 12, wherein the first device and the second device are different network devices, and the forwarding path information indicates an egress port and a next-hop device of the service flow.

18. A non-transitory computer-readable medium configured to store computer instructions that are executed by a processor to implement:
- receiving, by a first device, a control message sent by a second device, wherein the control message comprises a first gate scheduling period and first topology information, and the control message indicates that the first gate scheduling period is associated with the first topology information; and
- determining forwarding path information based on a service-level agreement (SLA) requirement and the control message, wherein the forwarding path information indicates that performance of forwarding a service flow meets the SLA requirement,
- wherein the first device is a control device, the second device is a network device, and the forwarding path information indicates an end-to-end forwarding path and a network slice that needs to be used by each network device on the forwarding path to forward the service flow.

* * * * *